(12) United States Patent
Smith et al.

(10) Patent No.: US 6,254,005 B1
(45) Date of Patent: Jul. 3, 2001

(54) CARD READER WITH CARD CAPTURE CLAMP

(75) Inventors: Craig Malcolm Smith, Delta; Robert Wellington Donaldson, Vancouver; Raymon Tsu-Kung Hsiao, Surrey, all of (CA)

(73) Assignee: QI Technologies Corp., Vancouver (CA)

( * ) Notice: Subject to any disclaimer, the term of this patent is extended or adjusted under 35 U.S.C. 154(b) by 0 days.

(21) Appl. No.: 09/325,531

(22) Filed: Jun. 3, 1999

(51) Int. Cl.[7] .................................................. G06K 7/60
(52) U.S. Cl. ........................................... 235/486; 235/475
(58) Field of Search .................................... 235/486, 475, 235/476, 492, 485, 483

(56) References Cited

U.S. PATENT DOCUMENTS

| | | | |
|---|---|---|---|
| 5,036,184 | 7/1991 | Sasaki | 235/479 |
| 5,089,694 | 2/1992 | Zerfahs et al. | 235/486 |
| 5,202,551 | 4/1993 | Parrer et al. | 235/486 |
| 5,331,138 | 7/1994 | Saroya | 235/449 |
| 5,404,000 | * 4/1995 | Nair et al. | 235/435 |
| 5,508,501 | * 4/1996 | Fujimoto et al. | 235/441 |
| 5,517,013 | 5/1996 | Bradbury | 235/485 |
| 5,554,840 | 9/1996 | Saroya | 235/441 |
| 5,780,836 | * 7/1998 | Iguchi et al. | 235/486 |
| 5,917,177 | * 4/1995 | Owa et al. | 235/486 |

\* cited by examiner

*Primary Examiner*—Michael G Lee
*Assistant Examiner*—Diane I. Lee

(74) *Attorney, Agent, or Firm*—Oyen Wiggs Green & Mutala

(57) ABSTRACT

A card reader card capture clamp having a base plate for slidably receiving a card. A switch detects movement of the card past a predetermined position and produces a "card insertion" signal representative thereof. A clamp plate pivots between a clamped position in which the card is clamped between the two plates, and an unclamped position in which the card is movable relative to the plates. The clamp plate is biased into the unclamped position in the absence of production of the card insertion signal. A solenoid coupled between the two plates is actuated upon production of the card insertion signal to overcome the biasing and move the clamp plate from the unclamped into the clamped position. The switch includes two switch arms respectively pivotally mounted on opposed rearward ends of the clamp plate. Magnets are provided on the switch arms, and magnetic field sensors are mounted adjacent to the switch arms. Movement of the card past the predetermined position moves the switch arms relative to the magnetic field sensors, causing the sensors to detect magnetic field changes and to thereupon produce the card insertion signal. A clamping detection sensor detects movement of the clamp plate into the clamped position and produces a "card clamped" signal representative thereof. The clamping detection sensor includes a magnetic field sensor mounted on the clamp plate and a magnet mounted adjacent to the clamp plate. Movement of the clamp plate from the unclamped into the clamped position moves the magnetic field sensor relative to the magnet, causing the magnetic field sensor to detect a magnetic field change and to thereupon produce the card clamped signal.

18 Claims, 10 Drawing Sheets

CARD READER WITH CARD CAPTURE CLAMP

TECHNICAL FIELD

A card reader for detecting insertion of a stored value "smart card" and clamping the card to securely retain the card within the reader throughout the processing of a transaction involving a card payment. If the card reader's power supply fails the card is not clamped and the card can be retrieved by its owner.

BACKGROUND

Card readers are electronic devices which may include electromechanical components. Such card readers are commonly provided in vending machines, point of sale terminals, etc. A consumer inserts a stored value "smart card", credit card or debit card into the card reader. Electronic circuitry provided within the card reader reads and processes information which is stored on the card, and may also update information on the card. This information enables the owner of the vending machine, point of sale terminal, etc. to obtain payment for products or services dispensed to the consumer. Card readers are also commonly used in access control systems to authenticate the card holder, and/or to provide access to buildings, parking garages, etc.

The present invention is directed to card readers adapted for use with so-called "smart cards", particularly card readers used in unattended point of sale ("UPOS") applications in which no human attendant is present to monitor, assist or otherwise supervise operation of the card reader or the associated vending machine, point of sale terminal, etc. An electronic "chip" on the smart card stores a value representative of a pre-paid monetary amount. The chip includes memory registers, and may also include a microprocessor. In a transaction based on a stored value smart card, a consumer inserts a smart card into a card reader. The card reader must not only read the monetary value stored on the card, but also cause the card's stored monetary value to be updated with a new value. The new value is the previously stored value minus the value of whatever purchase the consumer makes via the vending machine, point of sale terminal, etc. associated with the card reader into which the card is inserted.

In order to determine what value to subtract from the previously stored value to yield the new value, the card reader must know the value of the purchase made by the consumer. Modern vending machines and other UPOS devices are capable of dispensing products or services of different values. Accordingly, the value of the consumer's purchase may remain unknown until the consumer makes a purchase selection by actuating controls (extraneous to the card reader) such as push buttons or other controls provided on the vending machine or other UPOS device. The purchase price information which these controls provide is made available electronically to the card reader's circuitry. A time "window" of several hundred milliseconds, or even up to several seconds duration, can occur between the generation of the price information by the controls and the updating of the smart card with its new value.

The aforementioned window can be exploited by unscrupulous persons to obtain products or services without payment. In particular, when the consumer actuates the extraneous controls as aforesaid to make a purchase selection, the product or service is dispensed to the consumer without delay. At this point, the card reader's processing circuity has read the monetary or other value stored on the card, verified that such value is greater than or equal to the value of the purchase selection made by the consumer, and signalled the vending machine or other UPOS device to dispense the product or service. But, the card reader does not finish updating the card with the new value until some time after the product or service is dispensed. An unscrupulous person may withdraw the card from the card reader before it is updated with the new value.

The solution is to prevent withdrawal of the card from the card reader until after the card has been updated with the new value. The prior art has evolved a variety of pin lock mechanisms for preventing withdrawal of cards from card readers. Pin lock mechanisms operate by moving a pin in front of the card after the card has been inserted into the card reader. The pin blocks a portion of the card reader's card insertion slot, preventing withdrawal of the card from the card reader. After the card has been successfully updated with the new value, the card reader actuates the pin lock mechanism to retract the pin, whereupon the card may be withdrawn from the card reader. However, pin lock mechanisms are subject to a variety of problems. They are often mechanically complex, difficult to manufacture and difficult to maintain in reliable working order.

In some cases, pin lock mechanisms may fail to release the card to the consumer upon successful completion of the transaction. For example, pin lock mechanisms are often mechanically actuated by insertion of a card into the card reader, locking the card inside the card reader. Upon successful completion of the transaction, the card reader electronically or electromechanically actuates the pin lock mechanism, releasing the card as aforesaid so that it may be withdrawn from the card reader by the consumer. But, in the event of a power failure, the card reader can not be actuated to release the card unless standby battery power is available. Even if standby batteries are provided, the batteries may lose their charge. The consumer may thus lose the card and its entire stored monetary value, or at least be deprived of the card until trained service personnel intervene to manually override the pin lock and release the card.

Similarly, a consumer may fail to notice that a card reader equipped vending machine or other UPOS device is out of service and insert a card into the card reader. Insertion of the card may mechanically actuate the pin lock mechanism as above, locking the card inside the card reader. Because the vending machine or other UPOS device is out of service, and in the absence of standby battery power as aforesaid, trained service personnel may have to intervene in order to override the pin lock mechanism and release the card to the consumer.

A further difficulty is that physical limitations restrict the space which a pin lock mechanism can occupy within a card reader. This constrains the range of mechanical movement of the parts which make up the pin lock mechanism, consequently reducing the force with which the pin lock mechanism can retain the card. If the card is not retained with sufficient force, an unscrupulous person may defeat the pin lock mechanism by forcibly withdrawing the card from the card reader.

Pin lock mechanisms can also be compromised by cutting way part of the card's plastic substrate so that the pin lock mechanism is bypassed as the altered card is inserted into the card reader. This affords an opportunity to withdraw the card from the card reader before it can be updated with the new value, as noted above. Another tactic sometimes used by unscrupulous persons is to slide a thin piece of paper into the card reader, over the card, after the product has been dispensed, but before the card can be updated with the new value. The paper disrupts the required communication between the card reader and the card, preventing updating of the card with the new value.

Since each card has a unique identifier, it is potentially possible to address the foregoing problems by maintaining a database of cards which have been used in fraudulent circumstances and subsequently refusing to honour such cards. However, it is preferable to do everything possible to prevent fraudulent activity of this sort in the first place. The present invention provides a card reader card capture clamp which is directed to attaining that objective and to overcoming the foregoing problems.

Some smart cards also have a magnetic strip along one side of the card. Information stored in the strip is read by "swiping" the card's strip past a suitable read head. Although the present invention can be used with such cards, the benefits of the invention are generally inapplicable to such cards.

The prior art has evolved some card clamping devices. For example, U.S. Pat. No. 5,089,694 Zerfahs et al discloses a card reader having a mechanism for clamping a magnetic strip type card as a read/write assembly is moved past the card. Zerfahs et al do not appear to address the aforementioned problems in relation to electronic chip type smart cards. U.S. Pat. No. 5,517,013 Bradbury discloses a card reader having a motor-driven mechanism for clamping an electronic chip type smart card. Bradbury does not appear to address all of the foregoing problems.

SUMMARY OF INVENTION

The invention provides a card reader card capture clamp having a base plate for slidably receiving a card. A switch detects slidable movement of the card past a predetermined position on the base plate and produces a "card insertion" signal representative thereof. A clamp plate is pivotally connected to the base plate. The clamp plate pivots relative to the base plate between a clamped position in which a portion of the card forward of the card's electronic chip is clamped between the clamp plate and the base plate, and an unclamped position which allows movement of the card relative to the clamp plate and the base plate. The clamp plate is biased away from the base plate into the unclamped position in the absence of production of the card insertion signal. A solenoid coupled between the clamp plate and the base plate is actuated upon production of the card insertion signal to overcome the biasing and move the clamp plate from the unclamped position into the clamped position.

The switch includes a switch arm pivotally mounted on a rearward end of the clamp plate. A spring coupled between the clamp plate and the switch arm biases the switch arm toward the base plate. Slidable movement of the card past the predetermined position on the base plate overcomes the spring's bias and moves the switch arm away from the base plate, producing the card insertion signal. Advantageously, two switch arms are provided: one on each of the opposed rearward ends of the clamp plate, with springs biasing the respective switch arms toward the base plate.

Magnets are provided on the switch arms, and magnetic field (Hall Effect) sensors are mounted adjacent to the switch arms. Movement of the card past the predetermined position moves the switch arms, and thus the magnets, relative to the magnetic field sensors, causing the magnetic field sensors to detect magnetic field changes and to thereupon produce the card insertion signal.

A clamping detection sensor detects movement of the clamp plate into the clamped position and produces a "card clamped" signal representative thereof. The clamping detection sensor includes a magnetic field (Hall Effect) sensor mounted on the clamp plate and a magnet mounted adjacent to the clamp plate. Movement of the clamp plate from the unclamped position into the clamped position moves the magnetic field sensor relative to the magnet, causing the magnetic field sensor to detect a magnetic field change and to thereupon produce the card clamped signal.

DESCRIPTION

Figure 1:
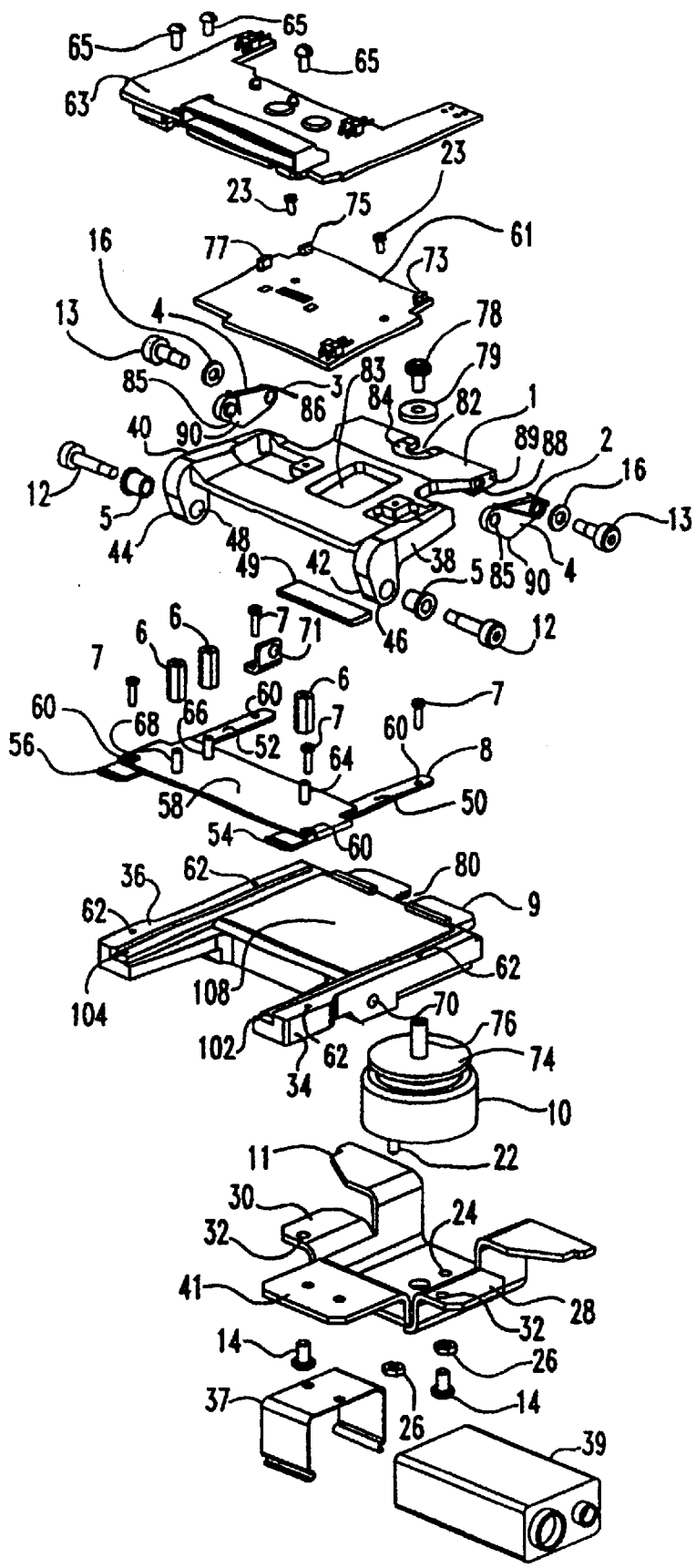
FIG. 1 is an oblique front exploded pictorial view of a card capture clamp in accordance with the invention.

The drawings illustrate a card reader card capture clamp in accordance with the invention. As best seen in FIG. 1, card capture clamp 20 incorporates clamp plate 1, guide plate 8, base plate 9, solenoid 10 and solenoid support bracket 11.

Solenoid 10 (which may be a Lucas Varity model 198959-01 solenoid has a lower, solenoid coil-containing portion and an upper, movable armature portion 74. The solenoid coil-containing portion is fastened to solenoid support bracket 11 by passing threaded protrusions 22 provided on the base of solenoid 10 through corresponding apertures 24 drilled through solenoid support bracket 11. Nuts 26 and lock washers are threaded onto protrusions 22 to hold solenoid 10 on solenoid support bracket 11. In the absence of applied electrical power, movable armature portion 74 is spring biased away from solenoid support bracket 11. Support bracket 11 is also used to mount the assembled card capture clamp 20 within a card reader (not shown).

A pair of parallel, outwardly extending flanges 28, 30 are provided on opposed sides of solenoid support bracket 11. An aperture 32 is drilled in each of flanges 28, 30. Machine screws 14 are passed through the respective apertures 32 and screwed into threadably mating apertures (not shown) provided in the undersides of the parallel, opposed, forwardly-extending arms 34, 36 of base plate 9, thereby fastening solenoid support bracket 11 beneath base plate 9. A clip 37 for supporting a battery 39 is fastened to the underside of the forwardly protruding flange portion 41 of solenoid support bracket 11. An open space is provided between and beneath the forward portions of arms 34, 36 to serve as a "debris chute" through which coins or other foreign objects may drop without entering card capture clamp 20.

Clamp plate 1 is formed with a pair of parallel, opposed, forwardly extending arms 38, 40. The forward ends of arms 38, 40 are formed with downwardly extending protrusions 42, 44 through which apertures 46, 48 respectively are drilled. A "friction grip means", such as neoprene pad 49, is provided on the underside of clamp plate 1 to retain a card during clamping as hereinafter explained.

Guide plate 8 has parallel, opposed arms 50, 52 having upturned forward ends 54, 56. Cross member 58 is fastened across the forward portions of arms 50, 52 by passing screws 7 through apertures 60 which extend through cross member 58 and through arms 50, 52 respectively. Four screws 7 are screwed into threadably mating apertures 62 drilled into the upward faces of arms 34, 36 of base plate 9, securely fastening guide plate 8 atop base plate 9.

The bottom ends of three upwardly protruding pins 64, 66, 68 are riveted to the upward face of cross-member 58. Hexagonal standoffs 6 are fitted over pins 64, 66, 68 respectively to support circuit board 63 on clamp plate 1 by fastening screws 65 into threaded apertures provided in the upper ends of each of pins 64, 66, 68. As hereinafter explained in greater detail, Hall Effect sensors 73, 75, 77 are mounted on circuit board 61, which is fastened to clamp plate 1 by fastening screws 23 into threaded apertures provided in the upper central portion of clamp plate 1. An "L" shaped bracket 69 is fixed to the rearward end of arm 52 by passing left rearward screw 7 through an aperture in the horizontally extending portion of bracket 69 and through rearward aperture 60 in guide plate arm 52 into rearward threaded aperture 62 in base plate arm 36. The upwardly extending portion of bracket 69 carries a magnet 71.

Clamp plate 1 is pivotally coupled to base plate 9 by inserting shoulder screws 12 through flange bushings 5 which are respectively received within the aforementioned apertures 46, 48 provided in the downwardly protruding portions 42, 44 of arms 38, 40 on clamp plate 1. The inward ends of shoulder screws 12 are screwed into threadably mating apertures 70 provided in the opposed lateral outward faces of arms 34, 36 of base plate 9. This enables clamp plate 1 to pivot about longitudinal axis 72 (FIG. 2) extending through the aligned apertures 46, 48 and 70.

Movable armature portion 74 of solenoid 10 includes an upwardly extending, internally threaded post 76. Post 76 extends upwardly through notches 80, 82 in the rearward edges of base plate 9 and clamp plate 1 respectively. The upper end of post 76 is held in place by fastening screw 78 through washer 79 into the post's internally threaded aperture. Washer 79 is positioned within "U" shaped groove 84 machined in clamp plate 1 around the upward facing portion of notch 82.

A pair of inverted triangular shaped switch arms 4 are pivotally mounted on the opposed rearward sides of clamp plate 1 by passing shoulder screws 13 through apertures 86 provided in the rearward ends of switch arms 4. The forward ends of switch arms 4 carry magnets 85. Screws 13 are fastened into threadably mating apertures 88 provided in the rearward lateral sides of clamp plate 1. This enables switch arms 4 to pivot about longitudinal axis 87 (FIG. 2) extending through the aligned apertures 86, 88.

Figure 2:
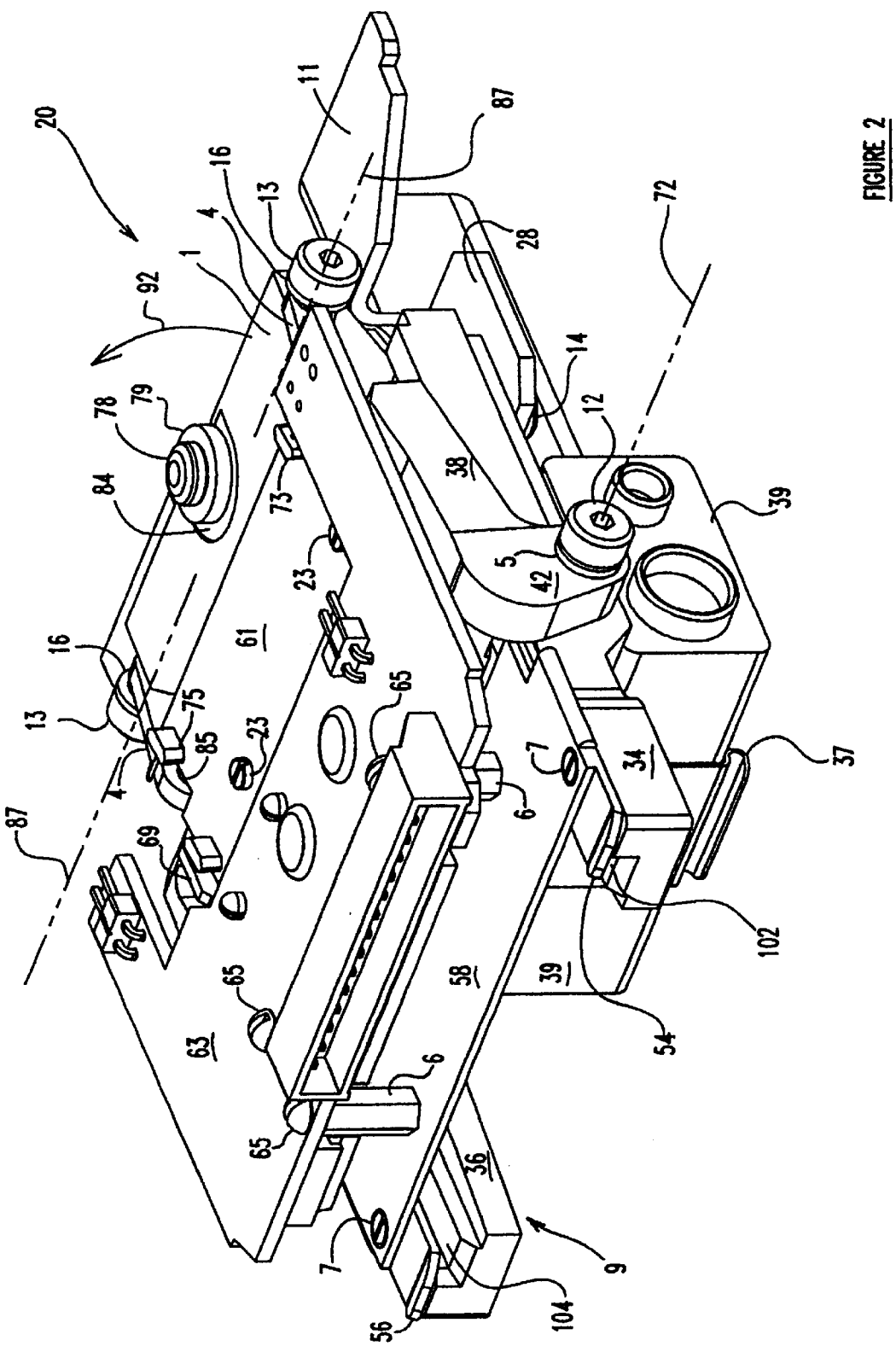
FIG. 2 is an oblique front pictorial view, on an enlarged scale, showing the assembled card capture clamp in the unclamped position.
Figure 3:
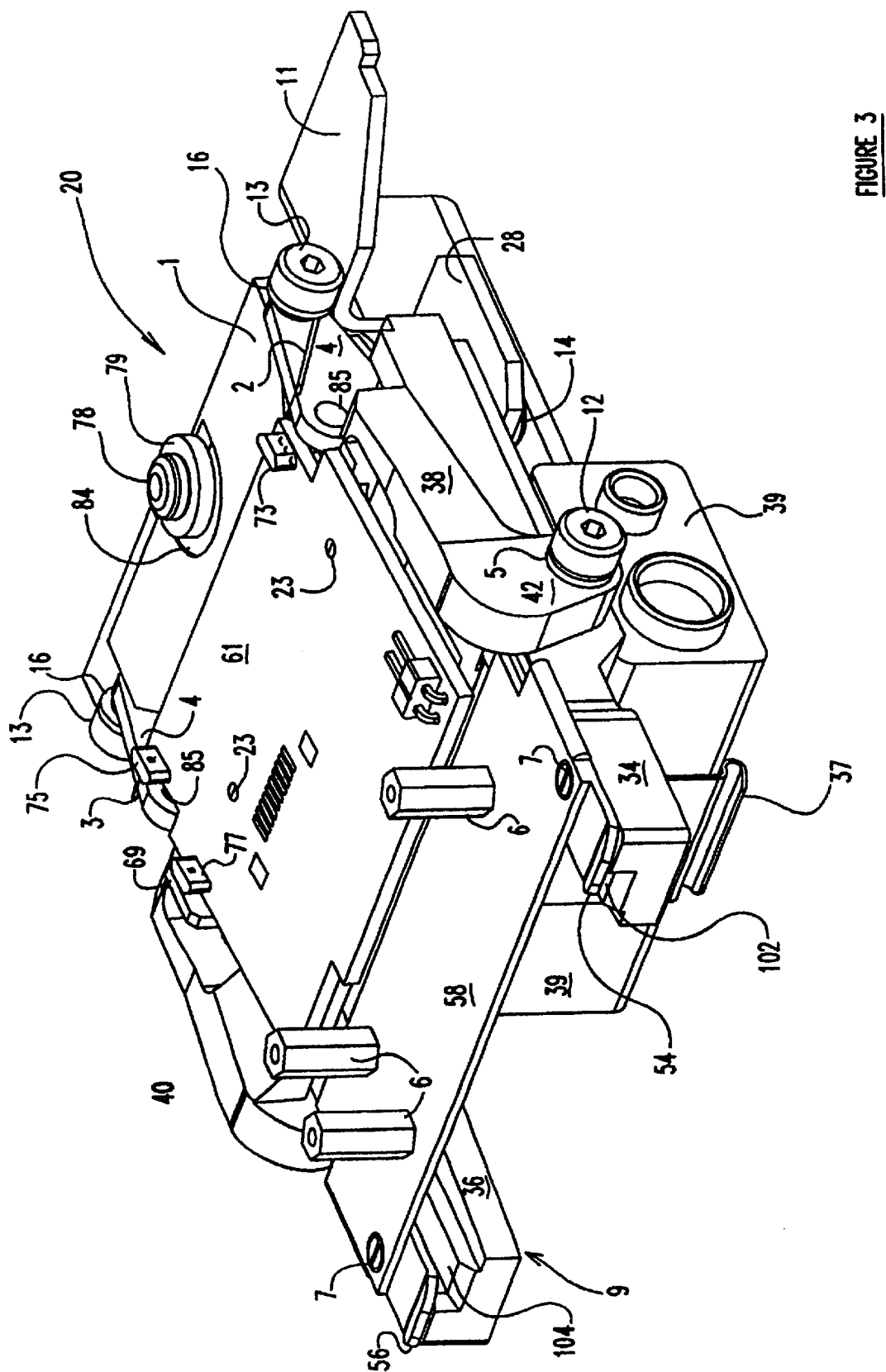
FIG. 3 is similar to FIG. 2, but with the uppermost circuit board removed.
Figure 4:
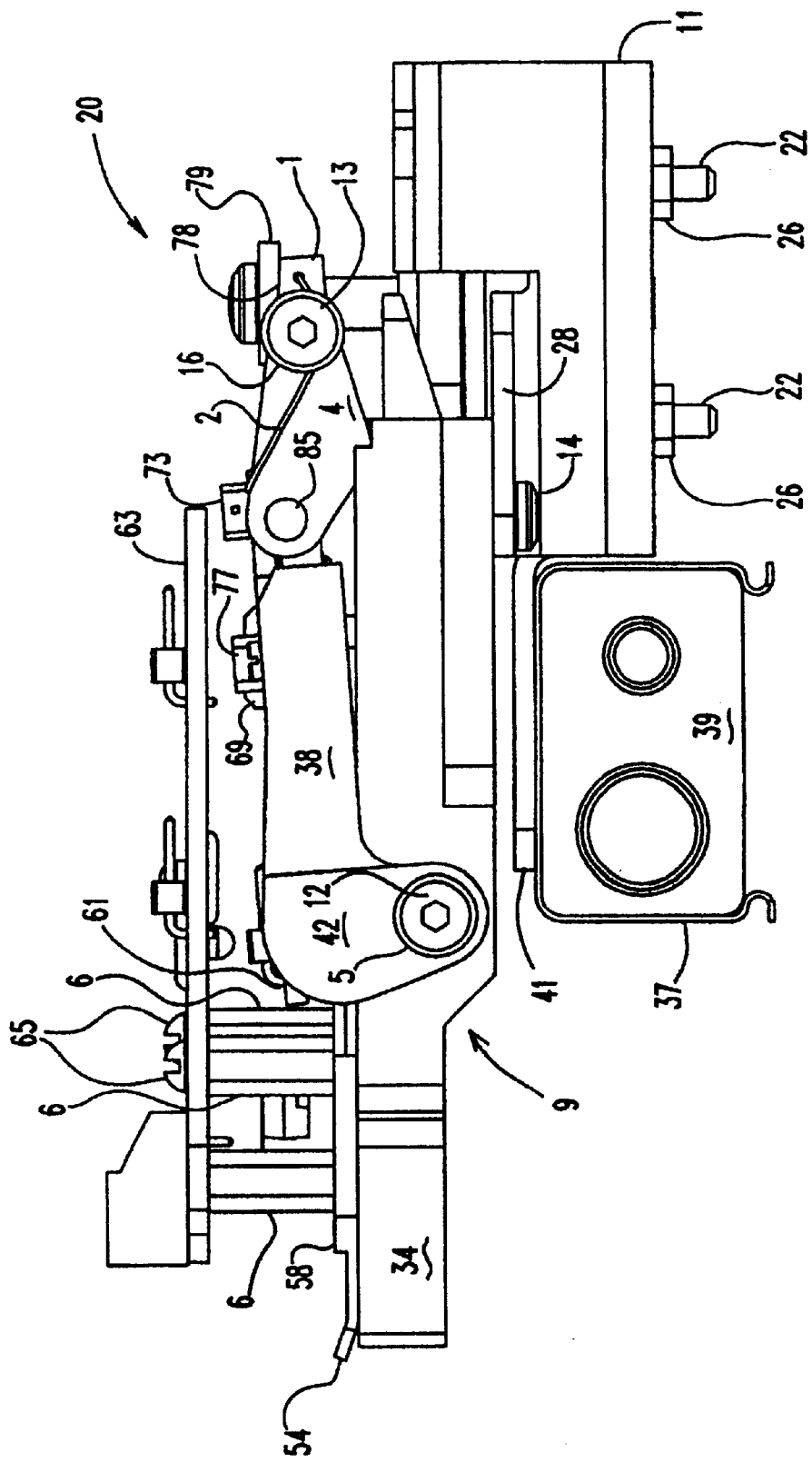
FIG. 4 is a right side elevation view, on an enlarged scale, showing the assembled card capture clamp in the unclamped position.

First and second torsion springs 2, 3 are fixed to switch arms 4 by passing screws 13 through washers 16 and through the springs' coiled portions during pivotal mounting of switch arms 4 on clamp plate 1 as aforesaid. One end of each spring is fixed within an aperture 89 provided in the rearward lateral sides of clamp plate 1, rearwardly of apertures 88. The springs' opposed ends bear against the upward edges of switch arms 4 respectively. The springs' tension is adjusted so that the springs respectively exert a downward biasing force on the switch arms. The lower, rounded, apex portions 90 of switch arms 4 bear against the upper rearward portions of arms 34, 36 of base plate 9, which in turn biases clamp plate 1 upwardly by rotating clamp plate 1 counter-clockwise about axis 72 in the direction indicated by arrow 92 (FIG. 2). This is the default "unlatched" position of card capture clamp 20, in which a card can readily be inserted into or withdrawn from the card reader.

Figure 9:
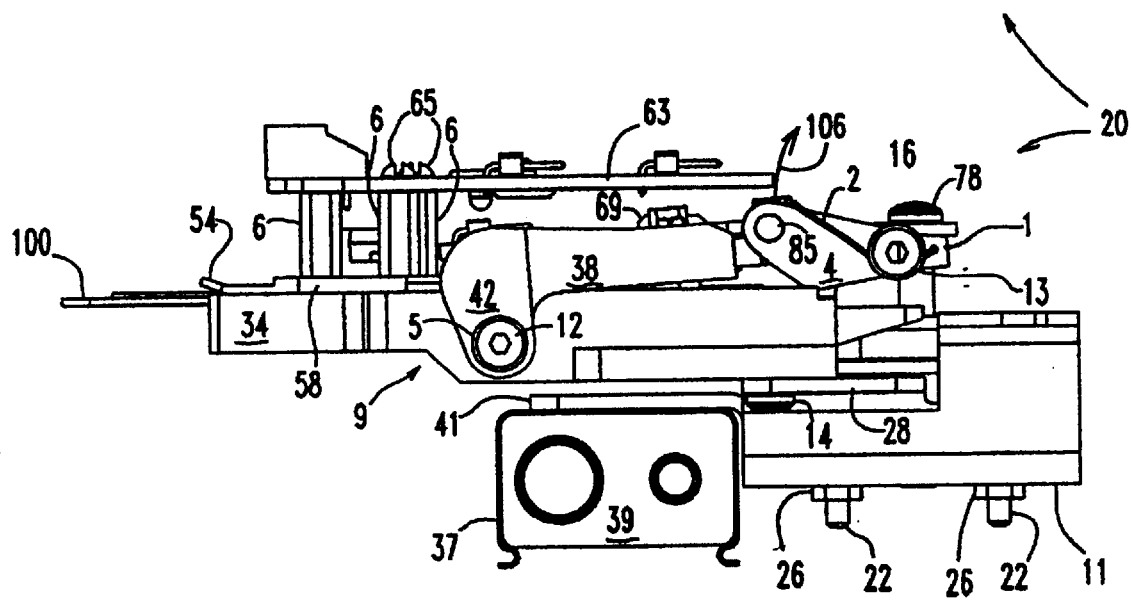

In operation, and with further reference being made to FIGS. 7–11, card 100 is inserted into the card slot defined by opposed, longitudinally extending channels 102, 104 machined into the inward and upward faces of base plate arms 34, 36 respectively. The rearward edge 101 (FIG. 8) of card 100 slides beneath the forward, downwardly and rearwardly extending edges of switch arms 4 and beneath the switch arms' rounded, apex portions 90, overcoming the tension of springs 2, 3. Switch arms 4 are thus lifted and rotated about axis 87, in the direction of arrow 106 (FIG. 9).

When switch arms 4 are lifted as aforesaid, magnets 85 on the switch arms' forward ends are moved past magnetic field sensors such as Hall Effect sensors 73, 75 which are respectively mounted on the right and left rearward corners of circuit board 61. Allegro 3240 ALU sensors are suitable for use as the Hall Effect sensors mentioned herein. Movement of magnets 85 relative to sensors 73, 75 changes the magnetic field in the vicinity of sensors 73, 75 respectively. Sensors 73, 75 detect the change in magnetic field and produce signals representative thereof. Magnets 85 and sensors 73, 75 serve as "object detection sensors", with the signals produced by sensors 73, 75 together constituting a "card insertion signal" representative of insertion of an object (not necessarily a card) into the card reader.

Only one switch arm, magnet and Hall Effect sensor are necessary to detect insertion of an unaltered smart card 100. However, it is preferable to provide two spaced apart switch arms, two magnets and two Hall Effect sensors, as previously described. This facilitates simultaneous detection of the insertion of card 100 along both opposed sides of the card, reducing susceptibility to fraud if a portion of the card's plastic substrate has been cut away as aforesaid in an effort to defeat a prior art pin lock mechanism.

Figure 10:
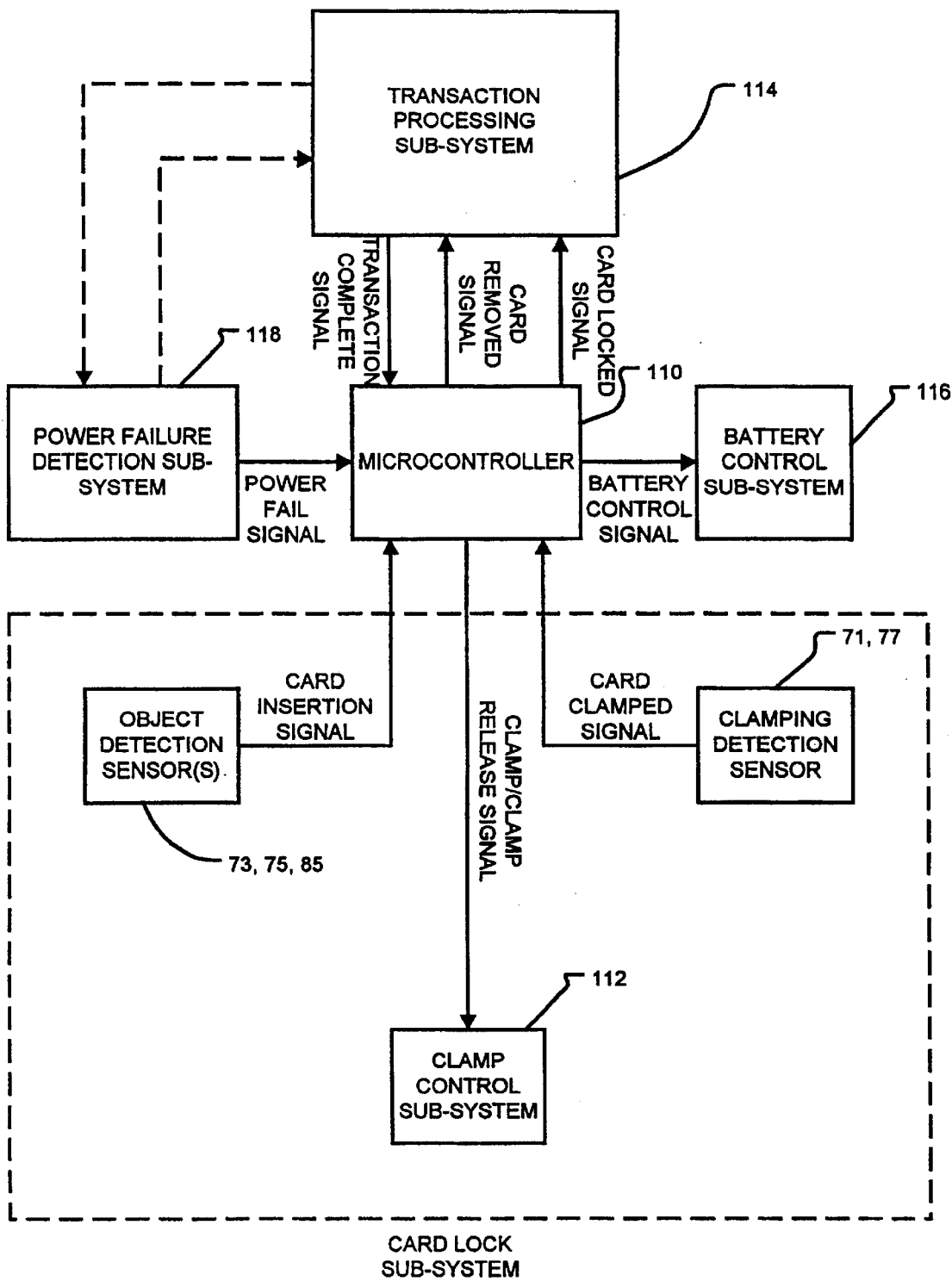
FIG. 10 is a system block diagram of a card reader having a card capture clamp in accordance with the invention.
Figure 11:
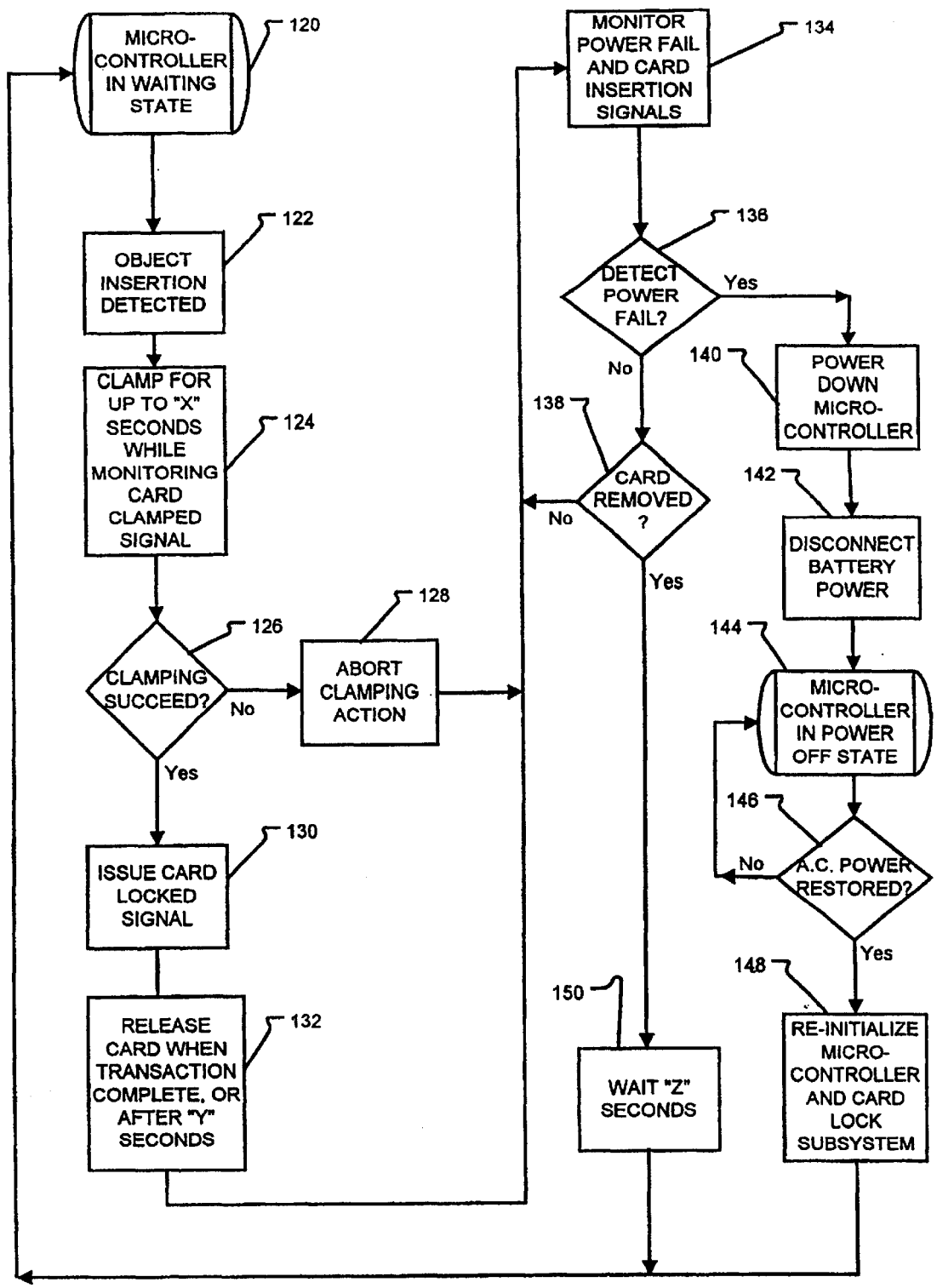
FIG. 11 is a flowchart illustrating the operation of a card reader card lock sub-system under microprocessor control in accordance with the invention.

The card insertion signal is passed to micro-controller 110 as shown in FIG. 10; and, interrupts the wait state as indicated by flowchart blocks 120, 122 (FIG. 11). Micro-controller 110 (which is mounted but not shown on circuit board 63) responds to the card insertion signal by actuating solenoid 10 (FIG. 11, block 124) so as to draw the movable armature portion 74 of solenoid 10 downwardly toward solenoid support bracket 11, overcoming the spring force which biases movable armature portion 74 away from solenoid support bracket 11 when solenoid 10 is not actuated as aforesaid. Because the upper end of solenoid post 76 is fixed with respect to clamp plate 1 as explained above, the aforementioned solenoid actuation pivots clamp plate 1 downwardly about axis 72 (FIG. 2; i.e. in the direction opposite to that indicated by arrow 92), bringing friction grip pad 49 on the rearward planar underside of clamp plate 1 into contact with card 100 and securely clamping card 100 between clamp plate 1 and base 108 (FIG. 1) of base plate 9 along about a one inch wide portion forward of the card's electronic chip, corresponding to the location and width of friction grip pad 49. Since some cards bear raised embossing, it is generally impractical to widen friction grip pad 49 to extend across the full width of the card. The solenoid's clamping force is sufficiently high that card 100 cannot be withdrawn from card capture clamp 20 without damaging card 100. As indicated in flowchart block 124, solenoid 10 is actuated for a limited, predetermined time ("X" seconds, where X is typically about one second), to limit the current applied to solenoid 10, thus avoiding potential damage to solenoid 10 if a non-card object is inserted, and avoiding futile attempts to clamp such objects.

Figure 5:
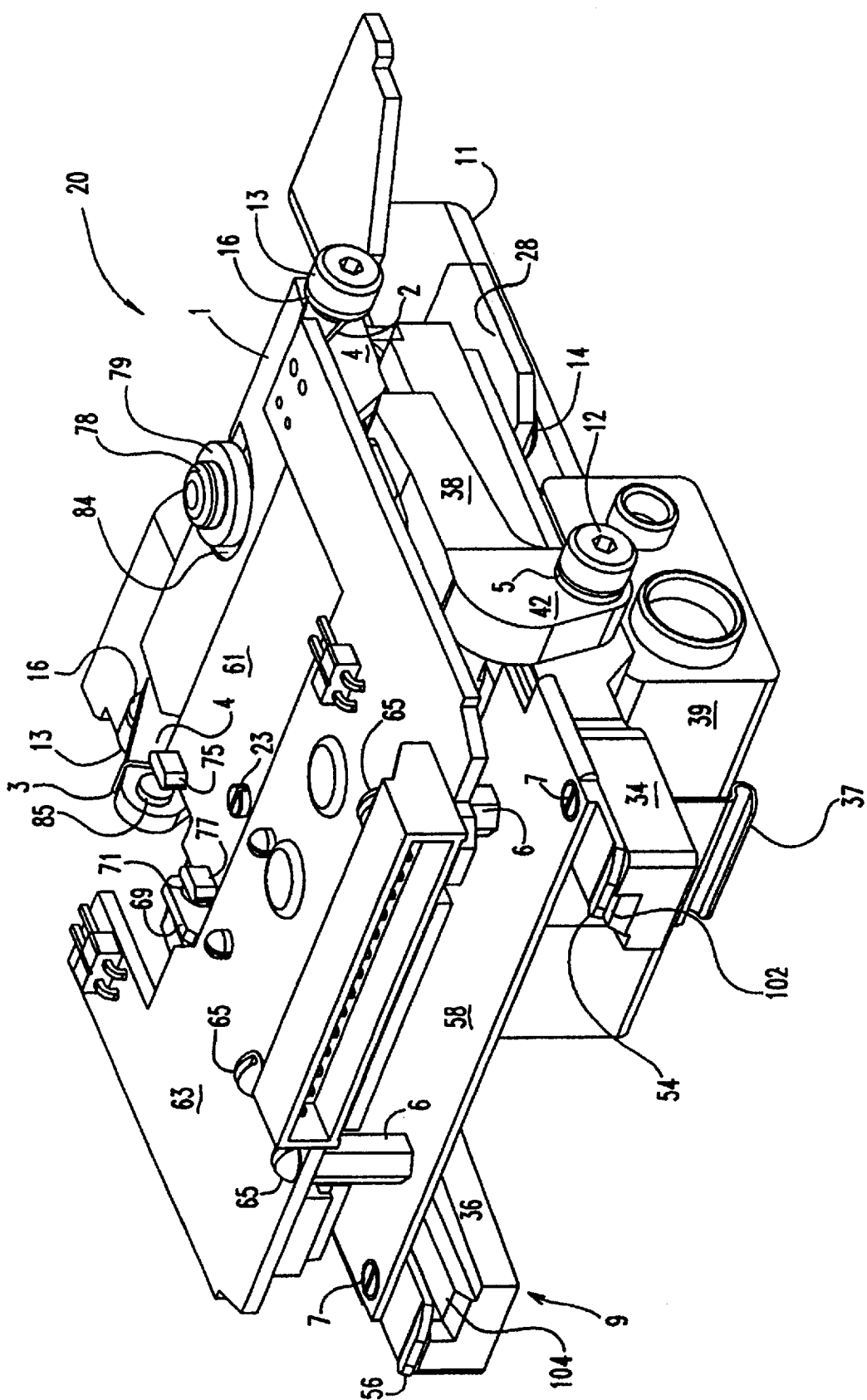
FIG. 5 is an oblique front pictorial view, on an enlarged scale, showing the assembled card capture clamp in the clamped position.
Figure 6:
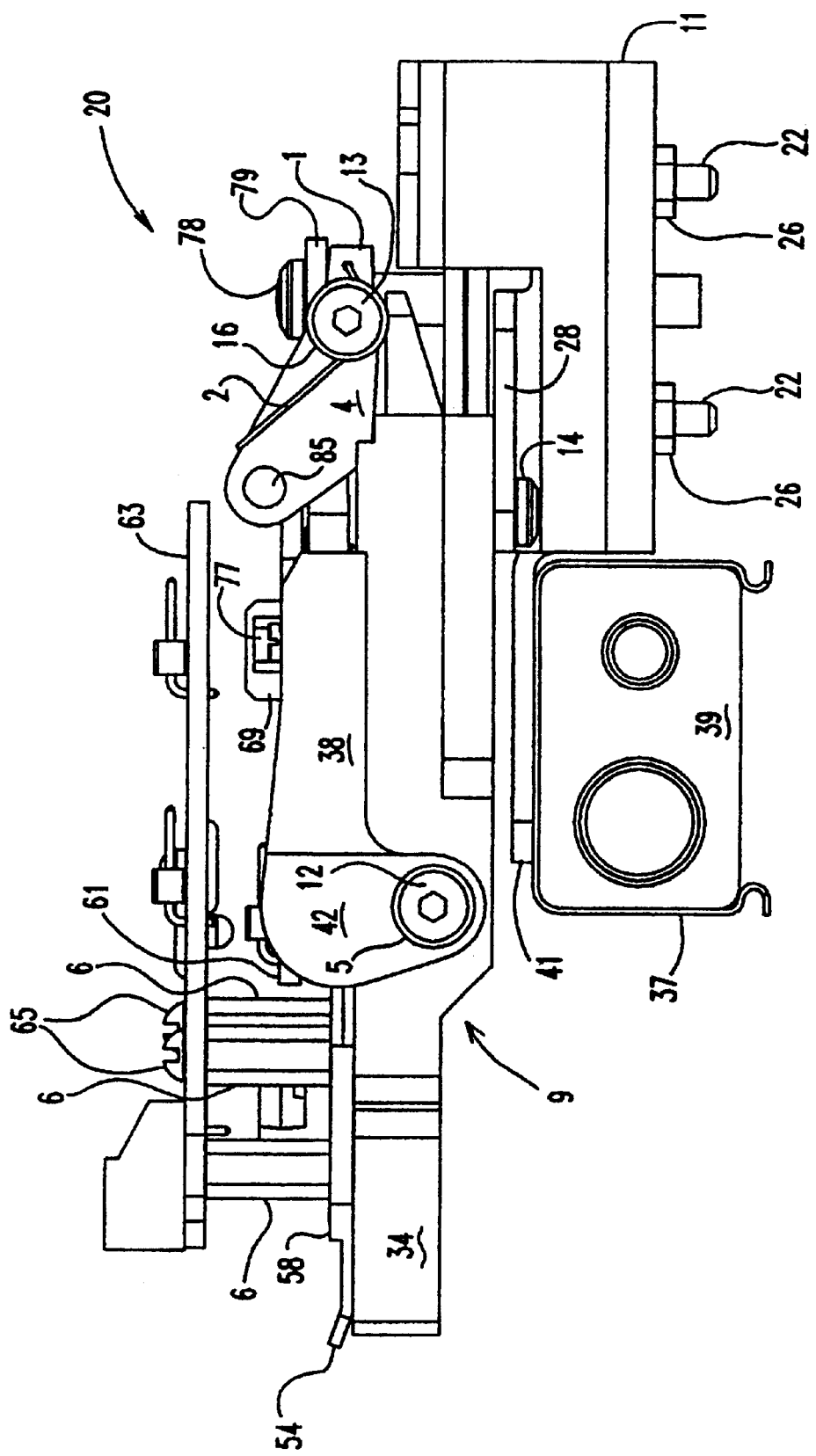
FIG. 6 is a right side elevation view, on an enlarged scale, showing the assembled card capture clamp in the clamped position.
Figure 7:
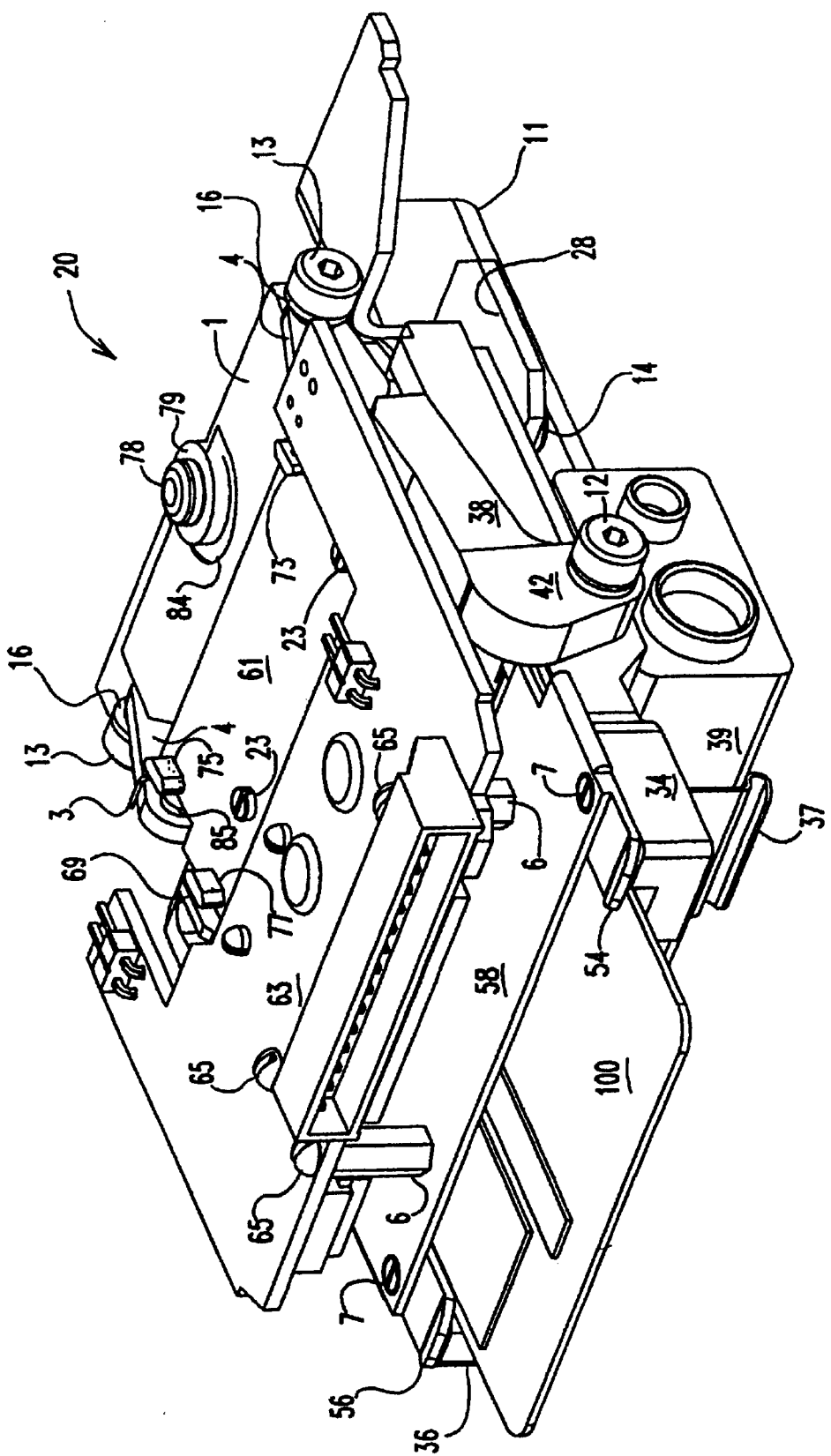
FIGS. 7, 8, and 9 are respectively oblique front pictorial, top plan, and right side elevation views, on an enlarged scale, showing the assembled card capture clamp in the unclamped position and showing a card partially inserted into the card capture clamp.
Figure 8:
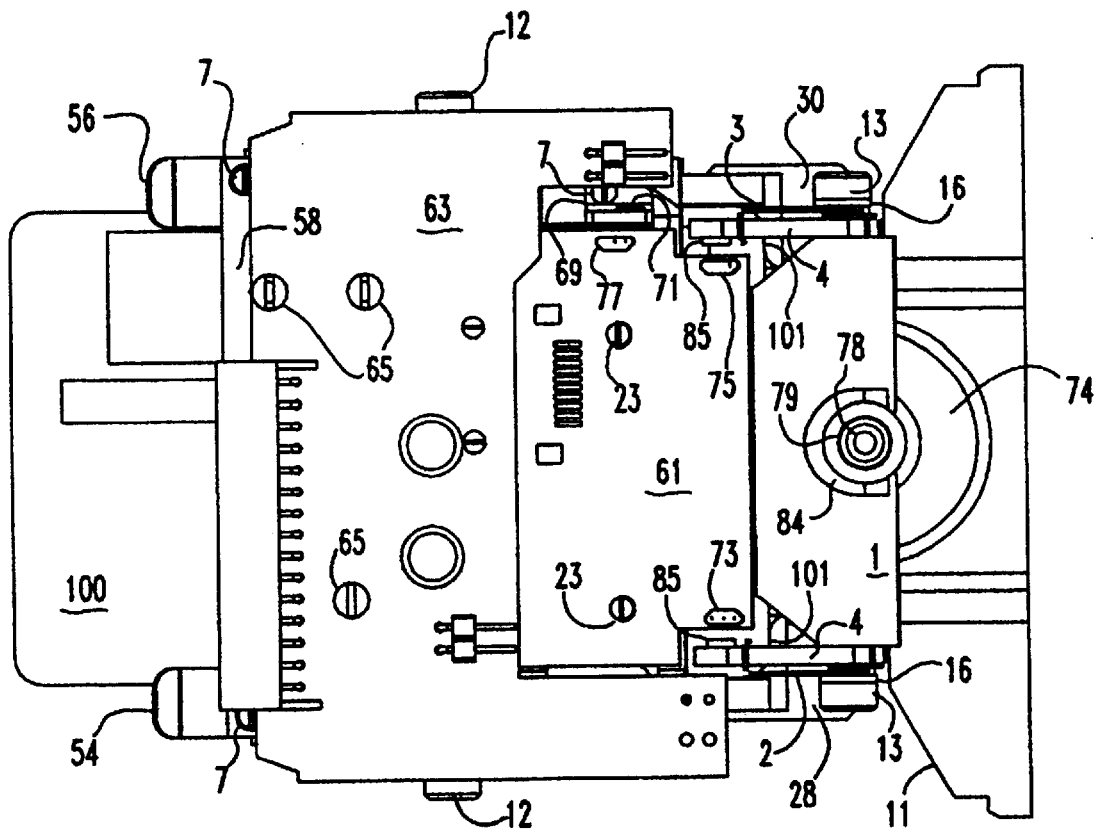

Successful clamping of card 100 is detected (FIG. 11, block 126) by movement, past magnet 71, of a third Hall Effect sensor 77 mounted on circuit board 61. More particularly, the above-described clamping of card 100 forward of the card's electronic chip pivots clamp plate 1 downwardly about axis 72, in a direction opposite to that indicated by arrow 92 (FIG. 2). Because circuit board 61 is fixed with respect to clamp plate 1, downward pivotal movement of clamp plate 1 moves Hall Effect sensor 77 downwardly and into a position (best seen in FIG. 5) adjacent to magnet 71, which remains fixed in position on bracket 69. Such movement changes the magnetic field in the vicinity of sensor 77, which detects the change and produces a signal representative thereof. Magnet 71 and sensor 77 thus serve as a "clamping detection sensor", with the signal produced by sensor 77 constituting a "card clamped" signal representative of successful clamping of card 100.

The card clamped signal is passed to micro-controller 110, as shown in FIG. 10. If the card clamped signal is not produced within the time frame permitted by flowchart block 124, then the card has not been successfully clamped, in which case micro-controller 110 sends a "clamp release" signal to de-energize solenoid 10. This aborts the card clamping action (block 128). If the card clamped signal is produced within the time frame permitted by flowchart block 124, then the card has been successfully clamped, in which case micro-controller 110 sends a "card locked" signal to a transaction processing sub-system ("transaction processor") 114.

The card locked signal notifies transaction processing sub-system 114 that the card has been successfully clamped, with the card's electronic chip in the proper position for data communication between the chip and read/write contacts (not shown) provided on circuit board 61. The read/write contacts on circuit board 61 extend through aperture 83 (FIG. 1) in clamp plate 1 to make electrical contact with corresponding contacts on the chip. Transaction processing sub-system 114 then implements the transaction in well known fashion as described above: the card is validated, products or services are dispensed to the consumer, and the card's chip is updated with a new monetary value to reflect the value of the consumer's purchase, etc. When the transaction is completed (i.e. after the card's chip is updated, or sooner if transaction processing sub-system 114 determines that the card is invalid or has insufficient remaining stored value, or if the consumer cancels the transaction by suitably actuating controls provided on the vending machine or other UPOS device) transaction processing sub-system 114 sends micro-controller 110 a "transaction complete" signal (FIG. 10).

Upon receipt of the transaction complete signal, micro-controller 110 sends the aforementioned clamp release signal to de-energize solenoid 10 and release the card (block 132). The clamp release signal is also sent to release the card if the transaction complete signal is not received by micro-controller 110 within a limited, predetermined time of "Y" seconds. "Y" is typically about 1.8 minutes to give the consumer adequate time to make a product or service selection and/or to abort the transaction in the event of a card reader or vending machine malfunction. De-energizing solenoid 10 allows the biasing action of springs 2, 3 to counter-rotate the rearward edge of clamp plate 1 in the direction of arrow 92, thereby releasing card 100 so that it may be withdrawn from the card reader.

Power failure detection sub-system 118 (FIG. 10) directly or indirectly monitors the external line voltage used to power the card reader. If the line voltage, or a signal representative thereof, falls below a predefined voltage threshold, a "power fail" signal is produced and sent by power failure detection sub-system 118 either directly to micro-controller 110 or indirectly via transaction processing sub-system 114. After sending the clamp release signal (or after clamping is aborted: FIG. 11, block 128) micro-controller 110 monitors (FIG. 11, block 134) the power fail and card insertion signals to determine whether the power fail signal has been produced and/or whether the consumer has removed the card from the card reader. Removal of the card from the card reader is indicated by an absence of the card insertion signal, which is produced continuously by sensors 73, 75 while the card is inserted, as previously explained. If the power fail signal is not detected (block 136), and if the card insertion signal is also not detected (block 138; i.e. if the card is moved such that the read/write contacts on circuit board 61 no longer make electrical contact with the contacts on the chip) then, after a wait of "Z" seconds (block 150; "Z" typically being about one second to allow for reinitialization of transaction processing sub-system 114), micro-controller 110 loops back under program control to block 120 to await the next object insertion event.

If the power fail signal is not detected (block 136), and if the card insertion signal is detected (block 138; i.e. if the card has not been removed from the card reader) then micro-controller 110 loops back under program control to block 134 to continue monitoring the power fail and card insertion signals.

If the power fail signal is detected (block 136; i.e. if an imminent power failure has been detected) then micro-controller 110 executes an orderly power down sequence (block 140) to preserve essential volatile information. Micro-controller 110 then sends (block 142) a "battery control" signal to battery control sub-system 116 (FIG. 10) in order to effectively disconnect battery 39 to avoid draining the battery. Battery control sub-system 116 is mounted, but not shown, on circuit board 63. Power supplied by battery 39 is required only to enable completion of a transaction followed by orderly shut down of the card reader, in the event that power fails after card 100 has been clamped and after a selected product or service has been dispensed to the consumer, but before the card's chip has been updated to reflect the value of the consumer's purchase. Battery power is not actually required to release the card because, in the absence of applied power, movable armature portion 74 of solenoid 10 is spring-biased away from solenoid support bracket 11 as previously explained, preventing clamping of card 100 between clamp plate 1 and base 108. Battery control sub-system 116 preferably includes suitable, well known means for recharging battery 39.

After disconnecting battery 39 as aforesaid, micro-controller 110 enters a power-off state (block 144) and remains in that state until the external line voltage power supply is restored (block 146). Vending machine components external to the card reader require full line voltage to operate. Since such components are unable to operate in the event of a power failure, it is preferable that the card reader remain inactive until full line power is restored. This is accomplished by the processing methodology illustrated in FIG. 11. Accordingly, no attempt is made to detect card insertion, or to clamp a card, in the event of a power failure. Moreover, if power fails at any time before a selected product or service has actually been dispensed to the consumer, micro-controller 110 immediately disconnects battery 39 as aforesaid and enters the power-off state (block 144). This ensures that the card is not updated if insufficient power is available to actually dispense products or services.

Upon power restoration, micro-controller 110 executes a re-initialization sequence (block 148) during which battery 39 is reconnected. Processing by micro-controller 110 then loops back to block 120 to await the next object insertion event.

A number of advantages of the invention will be apparent to persons skilled in the art. In particular, in the event of a power failure, solenoid 10 is deactivated, allowing springs 2, 3 to bias the rearward edge of clamp plate 1 in the direction of 92, thereby releasing card 100 as aforesaid. Accordingly, consumers' cards are not "trapped" within the card reader in the event of a power failure. The invention ensures that card 100 is securely retained within the card reader throughout the transaction processing interval and is not released to the consumer until after the card has been updated to reflect the purchase.

The invention is unaffected by most problems which can compromise prior art pin lock mechanisms. Specifically, because the card is securely clamped within the card reader along about a one inch wide portion forward of the card's electronic chip, the card cannot be withdrawn from the card reader even if a portion of the card has been cut away in an effort to circumvent a prior art pin lock mechanism. If the card is altered by cutting away a portion of the card's rearward edge then one or the other of switch arms 4 will not be lifted away from arms 34, 36 upon insertion of the card into the card reader. The object detection sensors and associated circuitry can easily be adapted, or micro-controller 110 suitably programmed, to inhibit processing of transactions unless both of the card insertion signals produced by movement of switch arms 4 are detected to indicate full insertion of a non-altered card into the card reader. Furthermore, actuation of solenoid 10 to clamp card 100 as described above leaves no gap between card 100 and the underside of clamp plate 1 into which an unscrupulous person may insert a piece of paper in an effort disrupt updating of the card's stored value.

As will be apparent to those skilled in the art in the light of the foregoing disclosure, many alterations and modifications are possible in the practice of this invention without departing from the spirit or scope thereof. For example, the positions of the various magnets and Hall Effect sensors could be reversed (i.e. with magnets 85 being mounted on circuit board 61 and Hall Effect sensors being mounted on switch arms 4, etc.) although this would complicate the required electrical connections to the Hall Effect sensors. Alternate placements of the various magnets and Hall Effect sensors are also possible to facilitate object insertion and/or clamping detection.

As another example, consider a further tactic unscrupulous persons may use to obtain products or services without payment, which is to connect thin wires to selected contacts on the smart card's chip and couple a switch to the wires. The altered card is inserted into the card reader, with the wires extending outside the card reader to the switch. Because the wires are sufficiently thin, the card can be successfully clamped. As long as the switch remains open the card appears to be valid to transaction processing sub-system 114. But, if the switch is closed after products or services have been dispensed, and before the card's chip is updated to reflect the value of the purchase, then the card contacts to which the wires are connected are short circuited, causing the card to appear invalid to transaction processing sub-system 114, frustrating updating of the card's chip. This tactic can be circumvented by providing a guillotine blade on the underside of clamp plate 1 such that the blade severs and/or short circuits the wires as the card is clamped. The short circuited wires enable transaction processing sub-system 114 to detect the card as invalid and prevent further transaction processing.

Yet another tactic unscrupulous persons may use to obtain products or services without payment is to select a product or service just prior to expiry of the "Y" second timeout interval (FIG. 11, block 132). In such circumstances, the card may be released, and goods or services dispensed, before transaction processing sub-system 114 can update the card to reflect the value of the purchase. This difficulty can be addressed by randomizing the value of "Y" with respect to a mean value, so that different timeout intervals occur in successive usages of the card reader, thus making it difficult for unscrupulous persons to accurately "time" operation of the system.

It must however be understood that, although the invention should defeat most casual and some determined attempts to obtain products or services by fraud, it is impossible to guarantee that concerted criminal efforts to obtain products or services by fraud will be defeated in all circumstances. The scope of the invention is to be construed in accordance with the substance defined by the following claims.

What is claimed is:

1. A card reader card capture clamp, comprising:
    (a) a base plate for slidably receiving a card;
    (b) a switch for detecting slidable movement of said card past a predetermined position on said base plate and for producing a card insertion signal representative thereof;
    (c) a clamp plate pivotally connected to said base plate for pivotal movement of said clamp plate relative to said base plate between:
        (i) a clamped position in which said card is clamped between said clamp plate and said base plate;
        (ii) an unclamped position in which said clamp plate is biased away from said base plate to allow movement of said card relative to said clamp plate and said base plate;
    (d) biasing means coupled between said clamp plate and said base plate to bias said clamp plate away from said base plate into said unclamped position in the absence of production of said card insertion signal; and,
    (e) a solenoid having a first portion coupled to said clamp plate and a second portion coupled to said base plate, said solenoid operable upon production of said card insertion signal to overcome said biasing means and pivotally move said clamp plate from said unclamped position into said clamped position.

2. A card reader card capture clamp as defined in claim 1, wherein said card is clamped, in said clamped position, between said clamp plate and said base plate along a portion of said card forward of an electronic chip bearing portion of said card.

3. A card reader card capture clamp as defined in claim 2, further comprising friction grip means on said clamp plate for contacting and frictionably gripping said card in said clamped position.

4. A card reader card capture clamp as defined in claim 1, 2 or 3, wherein:
   (a) said switch further comprises a switch arm pivotally mounted on a rearward end of said clamp plate; and,
   (b) said biasing means further comprises a spring coupled between said clamp plate and said switch arm to bias said switch arm toward said base plate;
       wherein said slidable movement of said card past said predetermined position on said base plate overcomes said biasing means and moves said switch arm away from said base plate to produce said card insertion signal.

5. A card reader card capture clamp as defined in claim 4, wherein:
   (a) said switch arm has an inverted triangular shape having a rounded apex; and,
   (b) said spring further biases said apex to contact said base plate at said predetermined position.

6. A card reader card capture clamp as defined in claim 4, wherein said switch further comprises a magnet on said switch arm and a magnetic field sensor mounted adjacent to said switch arm such that said movement of said card past said predetermined position moves said magnet relative to said magnetic field sensor, causing said magnetic field sensor to detect a magnetic field change and to thereupon produce said card insertion signal.

7. A card reader card capture clamp as defined in claim 6, wherein said magnetic field sensor is a Hall Effect sensor.

8. A card reader card capture clamp as defined in claim 1, 2 or 3, wherein:
   (a) said switch further comprises:
       (i) a first switch arm pivotally mounted on a first rearward end of said clamp plate;
       (ii) a second switch arm pivotally mounted on a second rearward end of said clamp plate, opposite said first rearward end;
   (b) said biasing means further comprises:
       (i) a first spring coupled between said clamp plate and said first switch arm to bias said first switch arm toward said base plate; and,
       (ii) a second spring coupled between said clamp plate and said second switch arm to bias said second switch arm toward said base plate;
       wherein said slidable movement of said card past said predetermined position on said base plate overcomes said biasing means and moves said first and second switch arms away from said base plate to produce said card insertion signal.

9. A card reader card capture clamp as defined in claim 8, wherein:
   (a) said first switch arm has an inverted triangular shape having a first rounded apex;
   (b) said second switch arm has an inverted triangular shape having a second rounded apex;
   (c) said first spring further biases said first apex to contact said base plate at a first position;
   (d) said second spring further biases said second apex to contact said base plate at a second position; and,
   (e) said first and second positions together comprise said predetermined position.

10. A card reader card capture clamp as defined in claim 8, wherein:
    (a) said first spring has a first end fixed to said first rearward end of said clamp plate, a second end biased against said first switch arm, and a coil portion encircling a first pivotal fastener interconnecting said first switch arm and said first rearward end of said clamp plate; and,
    (b) said second spring has a first end fixed to said second rearward end of said clamp plate, a second end biased against said second switch arm, and a coil portion encircling a second pivotal fastener interconnecting said second switch arm and said second rearward end of said clamp plate.

11. A card reader card capture clamp as defined in claim 8, wherein said switch further comprises:
    (a) a first magnet on said first switch arm;
    (b) a first magnetic field sensor mounted adjacent to said first switch arm;
    (c) a second magnet on said second switch arm; and,
    (d) a second magnetic field sensor mounted adjacent to said second switch arm;
        whereby said movement of said card past said predetermined position moves said first and second magnets relative to said first and second magnetic field sensors respectively, causing said first and second magnetic field sensors to detect magnetic field changes and to thereupon produce said card insertion signal.

12. A card reader card capture clamp as defined in claim 11, wherein said first and second magnetic field sensors are Hall Effect sensors.

13. A card reader card capture clamp as defined in claim 1, 2 or 3, wherein said solenoid second portion is coupled to said base plate by coupling said solenoid second portion to a solenoid support plate and by coupling said solenoid support plate to said base plate.

14. A card reader card capture clamp as defined in claim 1, 2 or 3, wherein:
    (a) said clamp plate further comprises first and second clamp arms on opposed sides of said clamp plate;
    (b) said first clamp arm further comprises a first downwardly extending member on a forward end of said first clamp arm;
    (c) said second clamp arm further comprises a second downwardly extending member on a forward end of said second clamp arm; and,
    (d) said clamp plate is pivotally connected to said base plate by pivotally attaching said first downwardly extending member to a first side of said base plate and pivotally attaching said second downwardly extending member to a second side of said base plate opposite said first side of said base plate.

15. A card reader card capture clamp as defined in claim 1, 2, or 3, further comprising a clamping detection sensor for sensing movement of said clamp plate from said unclamped position into said clamped position and producing a card clamped signal representative thereof.

16. A card reader card capture clamp as defined in claim 15, wherein said clamping detection sensor further comprises a third magnetic field sensor mounted on said clamp plate and a third magnet mounted adjacent to said clamp plate such that said movement of said clamp plate from said unclamped position into said clamped position moves said third magnetic field sensor relative to said third magnet, causing said third magnetic field sensor to detect a magnetic field change and to thereupon produce said card clamped signal.

17. A card reader card capture clamp as defined in claim 16, wherein said third magnetic field sensor is a Hall Effect sensor.

18. A card reader card capture clamp as defined in claim 1, 2 or 3, further comprising a blade on an underside of said clamp plate, said blade operable by said movement of said clamp plate into said clamped position to sever and/or short circuit wires connected to and extending beyond said electronic chip bearing portion of said card.

* * * * *